(12) United States Patent
Park

(10) Patent No.: US 9,892,251 B2
(45) Date of Patent: Feb. 13, 2018

(54) PRIVACY SCREEN FOR AMOBILE TERMINAL THAT DISPLAYS PROTECTED DATA

(71) Applicant: LG ELECTRONICS INC., Seoul (KR)

(72) Inventor: Hyungbin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 380 days.

(21) Appl. No.: 14/201,426

(22) Filed: Mar. 7, 2014

(65) Prior Publication Data

US 2014/0253526 A1  Sep. 11, 2014

(30) Foreign Application Priority Data

Mar. 8, 2013 (KR) .................. 10-2013-0025289

(51) Int. Cl.
  *G06F 3/048* (2013.01)
  *G06F 21/36* (2013.01)
  *H04W 12/08* (2009.01)
  *G06F 21/62* (2013.01)

(52) U.S. Cl.
  CPC .......... *G06F 21/36* (2013.01); *H04W 12/08* (2013.01); *G06F 21/629* (2013.01); *G09G 2340/12* (2013.01)

(58) Field of Classification Search
  CPC .... G06F 3/0483; G06F 3/04883; G06F 21/30; G06F 21/31; G06F 21/32; G06F 21/60; G06F 21/62; G06F 21/6254; G06F 3/0488; G06F 21/00; G06F 21/36; G06F 21/6245; G06F 21/629; H04L 63/083; H04L 63/102; H04L 63/105; H04L 67/306; H04W 12/06; H04W 12/08; H04M 1/72563; G09G 2340/12
  USPC ........ 715/778, 781, 741, 742, 821; 726/4–7, 726/16–19, 21, 26–30
  See application file for complete search history.

(56) References Cited

U.S. PATENT DOCUMENTS

| | | | | |
|---|---|---|---|---|
| 2003/0159071 A1* | 8/2003 | Martinez | ................. | G06F 21/31 726/8 |
| 2006/0284852 A1* | 12/2006 | Hofmeister | ........... | G06F 3/0483 345/173 |
| 2008/0163082 A1* | 7/2008 | Rytivaara | .............. | G06F 1/1626 715/762 |
| 2008/0209338 A1* | 8/2008 | Li | ...................... | G06F 17/30867 715/745 |
| 2012/0079432 A1* | 3/2012 | Lee | ....................... | G06F 3/0483 715/838 |
| 2013/0019193 A1* | 1/2013 | Rhee | ..................... | G06F 3/0486 715/769 |
| 2013/0305352 A1* | 11/2013 | Narendra | .............. | H04M 1/673 726/19 |
| 2014/0164980 A1* | 6/2014 | Clausen | ............. | G06F 3/04883 715/778 |

(Continued)

*Primary Examiner* — Ajay Bhatia
*Assistant Examiner* — Alex Olshannikov
(74) *Attorney, Agent, or Firm* — Lee, Hong, Degerman, Kang & Waimey

(57) ABSTRACT

A mobile terminal includes: a display; and a controller. The controller puts at least one screen corresponding to the current display screen and having the same execution depth into standby, and when a predetermined trigger operation is performed, further displays on the display a screen chosen from the at least one screen by the trigger operation.

20 Claims, 19 Drawing Sheets

(56) References Cited

U.S. PATENT DOCUMENTS

2014/0250390 A1\* 9/2014 Holmes ................ G06F 9/4443
　　　　　　　　　　　　　　　　　　　　　715/760

\* cited by examiner

FIG. 9
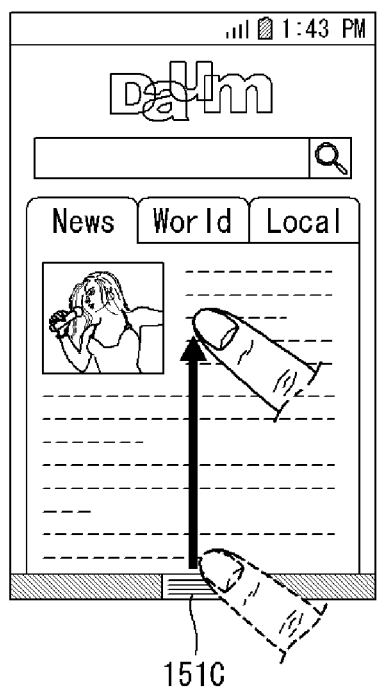
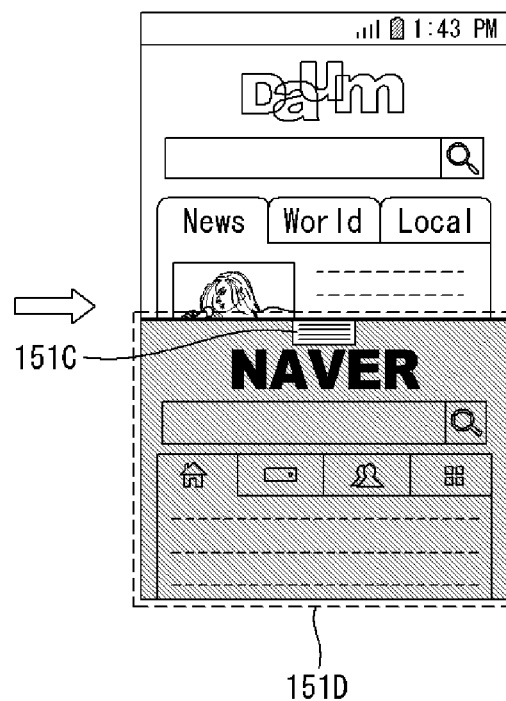

FIG. 10
(a)                (b)
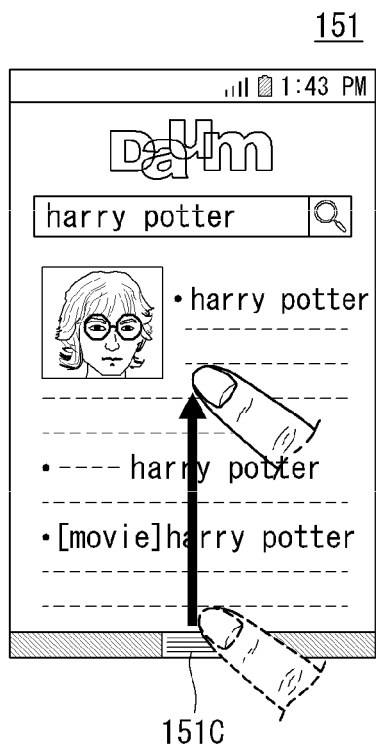
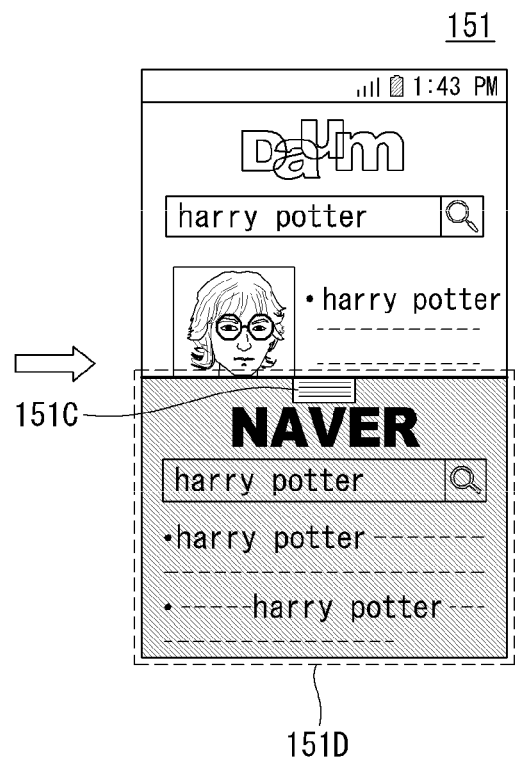

PRIVACY SCREEN FOR AMOBILE TERMINAL THAT DISPLAYS PROTECTED DATA

CROSS-REFERENCE TO RELATED APPLICATIONS

Pursuant to 35 U.S.C. § 119(a), this application claims the benefit of earlier filing date and right of priority to Korean Patent Application No. 10-2013-0025289, filed on Mar. 8, 2013, the contents of which are hereby incorporated by reference herein in its entirety.

TECHNICAL FIELD

The present invention relates to a mobile terminal, and more particularly, to a mobile terminal which offers easy access to information about the screen currently displayed on a display, and more particularly, to a mobile terminal which provides security and privacy protection and offers easy access to information about the current screen.

DISCUSSION OF THE RELATED ART

As the functionality of mobile terminals such as laptop computers, mobile phones, or smartphones is diversified, the mobile terminals are being implemented in the form of multimedia players equipped with complex functions, such as capturing images and video, playing music or video files, game, and reception of broadcast.

In order to support and increase the functionality of the mobile terminals, the improvement of structural or software portions or both of the mobile terminals may be taken into consideration.

The recent spread of BYOD (Bring your own device), which allows the use of mobile terminals such as smartphones, smart pads, laptops, or tablet PCs in the workplace, leads to a growing demand for data protection and security and easy access to data

SUMMARY

An aspect of the present invention is to provide a mobile terminal which offers easy access to information about the screen currently displayed on a display.

Another aspect of the present invention is to provide a mobile terminal which provides security and privacy protection and offers easy access to information about the current screen.

It is to be understood that the present invention is not limited to the aforementioned aspects and other aspects which are not mentioned herein will be apparent from the following description to those skilled in the art to which the present invention pertains.

An exemplary embodiment of the present invention provides a mobile terminal including: a display; and a controller. The controller may put at least one screen corresponding to the current display screen and having the same execution depth into standby, and when a predetermined trigger operation is performed, may further display on the display a screen chosen from the at least one screen by the trigger operation.

When a predetermined authentication procedure is performed, with the current display screen being displayed, the controller may put the at least one screen into standby. The controller may be configured in such a way that at least part of information obtained by executing the screen chosen by the trigger operation is not stored or access to at least part of the obtained information is limited.

If the current display screen is wallpaper, the at least one screen may be a screen including the execution icons of applications designated as private applications. Also, if the mobile terminal is operating based on a first user identity module and the current display screen is wallpaper, the at least one screen may be a corresponding wallpaper for a second user identity module equipped in the mobile terminal.

If the current display screen is an execution screen of a particular application, the at least one screen may be a screen that provides content corresponding to the particular application and designated as private content. Also, if the current display screen is an execution screen of a particular function of a particular application, the at least one screen may be an execution screen of a corresponding particular function of another application corresponding to the particular application.

If the particular application is an application that operates based on the first user identity module, the at least one screen may be an execution screen of another application that corresponds to the particular application and is executed based on a second user identity module equipped in the mobile terminal. Also, if the current display screen is a log-in screen of a particular site, the at least one screen may include a screen including a user interface for logging in to at least one other site by using log-in information about the particular site.

The controller may display the screen chosen by the trigger operation to be overlaid on the current display screen and keep activating the selectable area in the user interface for the current display screen, which is not overlaid with the chosen screen.

The controller may display the screen chosen by the trigger operation to be rendered opaque or semi-transparent, overlaid on the current display screen, and keep activating a selectable area in the user interface for the current display screen, which is not overlaid with a selectable area in a user interface for the chosen screen.

Another exemplary embodiment of the present invention provides a mobile terminal including: a display; and a controller. The controller may search for information related to a particular function that is performed through the current display screen and put at least one screen where the searched information is displayed into standby, and when a predetermined trigger operation is performed, may further display on the display a screen chosen from the at least one screen by the trigger operation.

When a predetermined authentication procedure is performed, with the current display screen being displayed, the controller may put the at least one screen into standby.

If a payment is being made on a particular site by a particular means of payment through the current display screen, the at least one screen may include at least either a screen that presents a list of payments made on the particular site or a screen that presents a list of payments made by the particular means of payment. Also, if the current display screen is a log-in screen of a particular site, the at least one screen may include a screen including a user interface for logging in to at least one other site by using log-in information about the particular site.

The mobile terminal according to the present invention offers easy access to information about the screen currently displayed on a display.

The mobile terminal according to the present invention provides security and privacy protection and offers easy access to information about the current screen.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 9 shows an example where the initial execution screen of a second web browsing application having the same execution depth as the initial execution screen of a first web browsing application is on standby and displayed on the display according to the driving method of the mobile terminal of FIG. 2.

FIG. 10 shows an example where a search results screen of the second web browsing application having the same execution depth as a search results screen of the first web browsing application is on standby and displayed on the display according to the driving method of the mobile terminal of FIG. 2.

DETAILED DESCRIPTION

Figure 1:
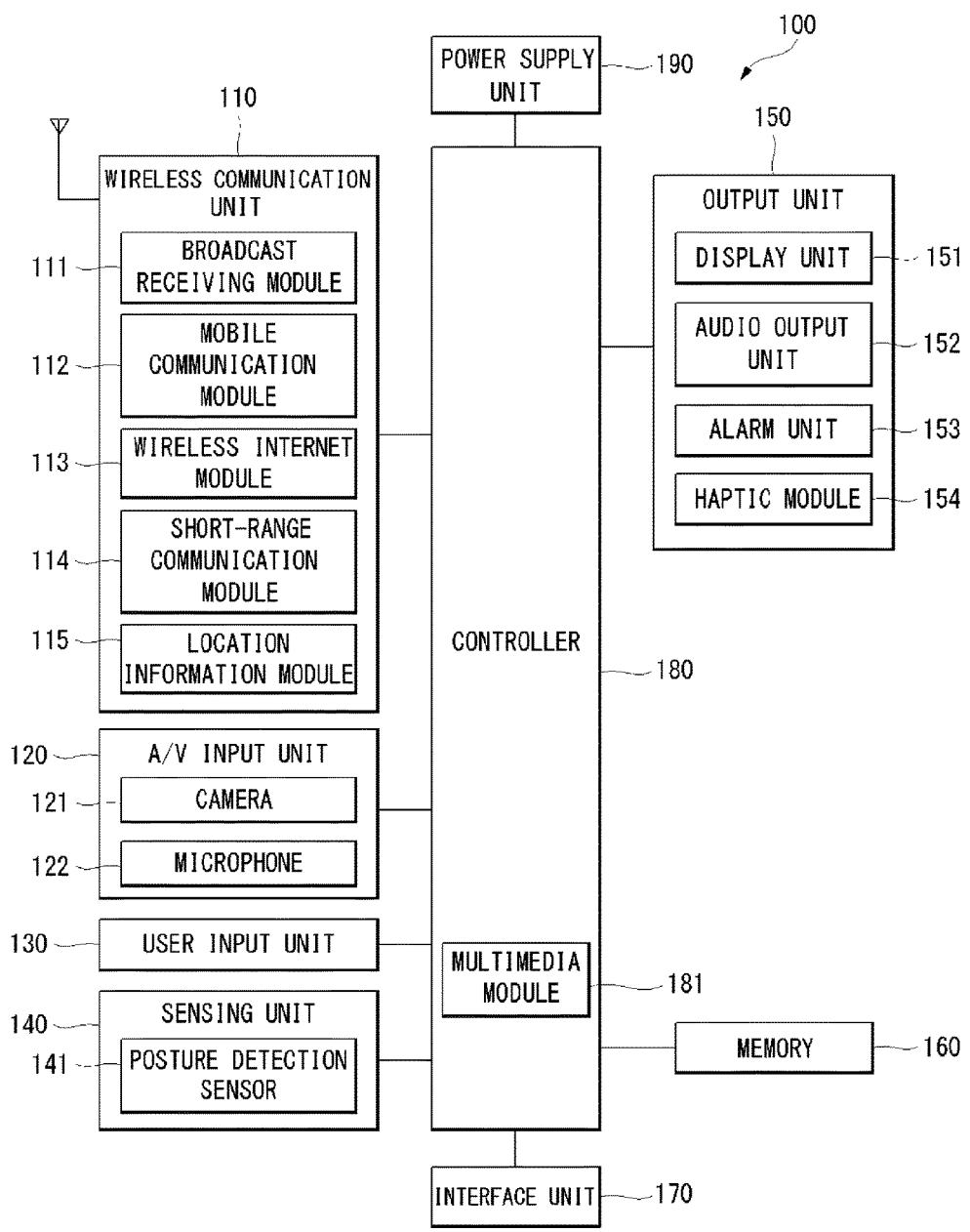
FIG. 1 is a block diagram of a mobile terminal according to the present invention.

The above and other aspects, features and advantages of the present disclosure will be more apparent from the following detailed description taken in conjunction with the accompanying drawings. Hereinafter, exemplary embodiments according to the present invention will be described in detail with reference to the accompanying drawings. Like reference numerals refer to like elements throughout the specification. In describing the present disclosure, detailed descriptions of well-known functions or configurations will be omitted in order to not necessarily obscure the subject matter of the present disclosure.

A mobile terminal according to the present invention may be described below in more detail with reference to the accompanying drawings. In the following description, suffixes "module" and "unit" may be given to components of the mobile terminal in consideration of only facilitation of description and do not have meanings or functions discriminated from each other.

The mobile terminal to be described in this specification may include a cellular phone, a smart phone, a laptop computer, a digital broadcasting terminal, personal digital assistants (PDA), a portable multimedia player (PMP), a navigation system, a dedicated terminal, etc. However, the scope of the present invention is not limited thereto.

FIG. 1 is a block diagram of a mobile terminal 100 according to an embodiment of the present invention.

The mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal 100 can be varied.

Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal.

The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160.

The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 is a module for identifying or otherwise obtaining the location of a mobile terminal. The location information module 115 may obtain location information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

A global positioning system (GPS) module is a representative example of the location information module 115. According to the current technology, the GPS module 115 may calculate information on distances between one point or object and at least three satellites and information on a time when distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. Additionally, the GPS module 115 may continuously calculate a current position in real time and calculate velocity information using the location or position information.

Referring to FIG. 1, the A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. The sensing signal may be transmitted to the controller 180 so that the controller 180 performs a particular function based on it.

Although FIG. 1 illustrates only a posture detection sensor 141 for detecting the posture of the mobile terminal 100, the sensing unit 140 may include a touch sensor for detecting a user's touch, a vibration sensor for detecting a vibration generated based on the user's touch, a gyro sensor for detecting a rotation of the mobile terminal 100, an acceleration sensor, and a geomagnetic sensor. However, the scope of the present invention is not limited thereto.

For example, if the mobile terminal 100 is a slide phone, the sensing unit 140 may sense whether the slide phone is opened or closed. Further, the sensing unit 140 may sense whether the power supply 190 supplies power and/or whether the interface 170 is connected to an external device. Meanwhile, the sensing unit 140 may include a proximity sensor.

The output unit 150 may generate visual, auditory and/or tactile output, and the output unit 150 may include the display 151, an audio output module 152, an alarm 153 and a haptic module 154.

The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a 3D display.

Some of the above displays may be configured as a transparent or light transmissive type display through which the outside may be viewed. This may be called "transparent display". An example of the transparent display includes a transparent LCD. A rear structure of the display 151 may also be of a light transmissive type. Accordingly, a user may see an object located behind the body (of the mobile terminal 100) through the transparent area of the body of the mobile terminal 100 is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter, referred to as a touch sensor) form a layered structure (hereinafter, referred to as a touch screen), the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal (signals) corresponding to the touch input may be transmitted to a touch controller. The touch controller may then process the signal(s) and transmit data corresponding to the processed signal(s) to the controller 180. Accordingly, the controller 180 may detect a touched portion of the display 151.

The proximity sensor may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor.

A capacitive touch screen may be constructed such that proximity of a pointer is detected through a variation in an electric field according to the proximity of the pointer. The touch screen (touch sensor) may be classified as a proximity sensor.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The sound output unit 152 may output sound through an earphone jack (not shown in drawings). The user can connect earphones to the earphone jack and hear the output sound.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices.

For example, the interface 170 may include a wired/wireless headset port, an external charger port, a wired/wireless data port, a memory card port, a port for connecting a device having a user identity module, an audio I/O port, a video I/O port, and/or an earphone port.

The interface 170 may include a card slot through which a card-type user identity module may be inserted. Then, the user identity module may be coupled with the mobile terminal 100 through the card slot. At this time, a plurality of user identity modules may be connected to the interface unit 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be implemented within the controller 180 or separately from the controller 180.

As a more concrete example, the controller 180 may perform the function for controlling the reception mode of other mobile terminals that have receive the same ambient sound, the function of transmitting and receiving data to and from other mobile terminals, and so on. Also, the controller 180 may perform the function for controlling the reception mode or the function for transmitting or receiving data to and from other terminals that have received the same ambient sound, under the control of a control system that has received the same ambient sound.

The controller 180 may perform a pattern recognition process capable of recognizing handwriting input or picture-drawing input applied to the touch screen as characters or images.

The power supply 190 may receive external power and internal power and provide power required for operations of the components of the mobile terminal 100 under control of the controller 180.

The various embodiments described herein may be implemented as software, hardware, or a combination thereof in a storage medium that may be read by a computer or a similar device thereof.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
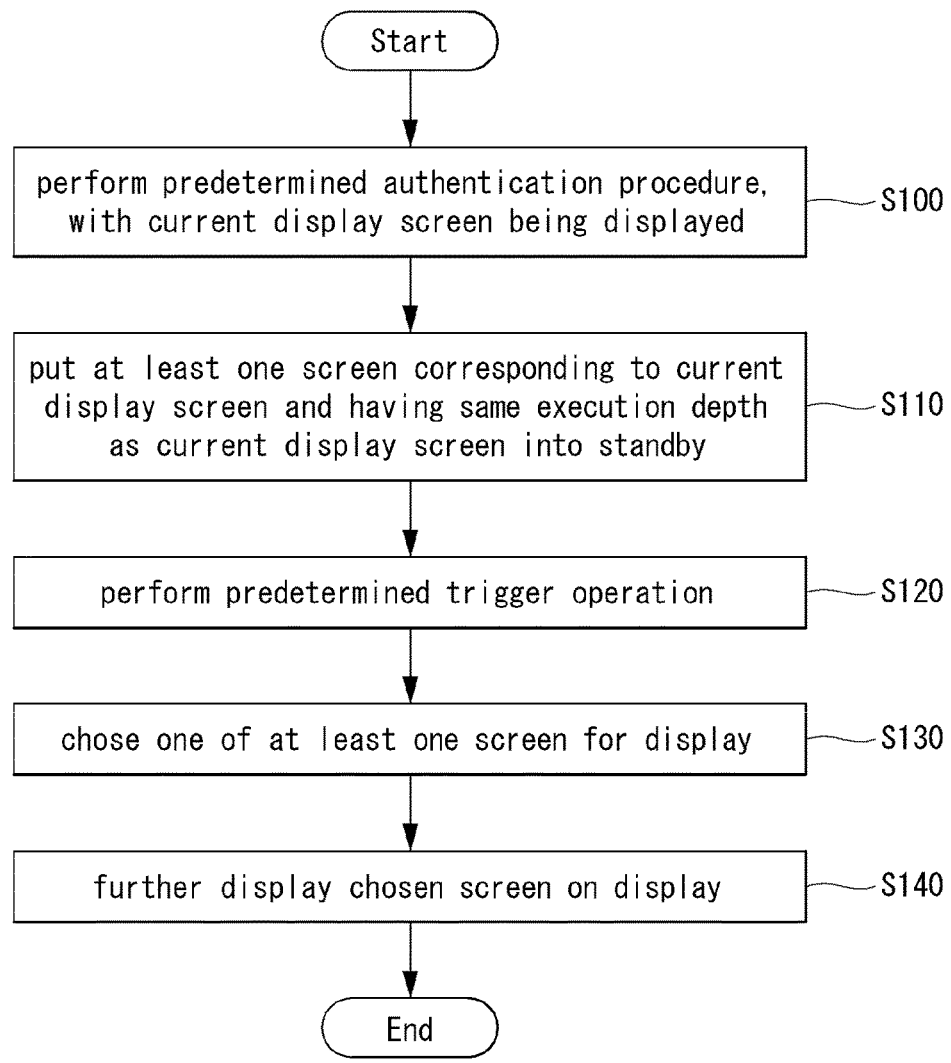
FIG. 2 is a flowchart showing an example of a driving method of a mobile terminal according to an embodiment of the present invention.

FIG. 2 is a flowchart showing an example of a driving method of a mobile terminal 100 according to an embodiment of the present invention. The driving method will be described below with reference to the drawings as necessary.

With the current display screen being displayed on the display 151, a predetermined authentication procedure is performed (S100). Then, the controller 180 puts at least one screen corresponding to the current display screen and having the same execution depth as the current display screen into standby (S110).

Figure 3:
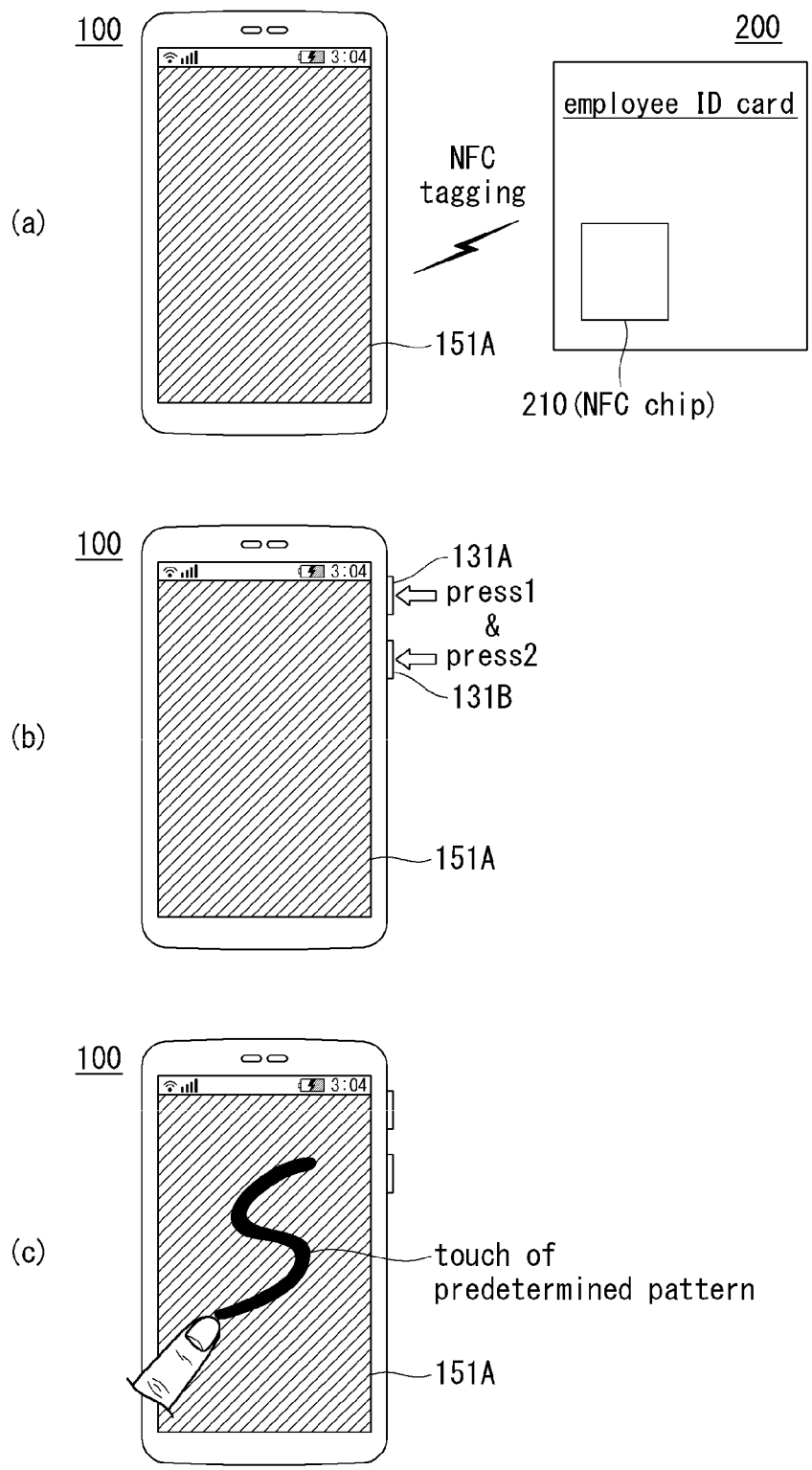
FIG. 3 shows examples of a user authentication procedure which is performed to put another screen having the same execution depth as the current display screen into standby, in the mobile terminal according to the present invention.

FIG. 3 shows examples of a user authentication procedure which is performed to put another screen having the same execution depth as the current display screen into standby, in the mobile terminal 100 according to the present invention.

Referring to (a) of FIG. 3, it is found out that the predetermined authentication procedure is performed, with the current display screen 151A being displayed, by using an NFC-tagged employee ID card 200 with an NFC (Near Field Communication) chip 210 which stores authentication information. NFC tagging also can be used for other types of electronic devices with an NFC chip which stores authentication information.

Referring to (b) of FIG. 3, the predetermined authentication procedure may be performed, with the current display screen 151A being displayed, by pressing hotkeys for hardware buttons 131A and 131B. For example, these hotkeys may be, but not limited to, a combination of the power button and the volume up or volume down button, or a combination of the power button and the home button, or a combination of the home button and the volume up or volume down button.

Referring to (c) of FIG. 3, the predetermined authentication procedure may be performed, with the current display screen 151A being displayed, by touching the display 151 equipped with a touch screen function in a predetermined pattern. The predetermined touch pattern may be, but not limited to, a predetermined figure, character, number, or word.

The authentication procedures illustrated in FIG. 3 are merely examples of authentication procedures which are performed on the mobile terminal 100 according to the present invention. That is, the predetermined authentication procedure performed on the mobile terminal 100 according to the present invention may include various authentication procedures as well as the authentication procedures illustrated in FIG. 3.

Referring again to FIG. 2, a predetermined trigger operation is performed by the user, with the at least one screen being on standby (S120). Then, the controller 180 chooses one of the at least one screen that corresponds to the predetermined trigger operation (S130), and further displays the chosen screen on the display 151 (S140).

In this specification, the screen having the same execution depth as the current display screen may be a screen for providing the same functionality provided through the current display screen. Also, the screen having the same execution depth as the current display screen may be a screen which provides the same functionality provided through the current display screen, and for which a user operation needs to be done the same number of times as required to display the current display screen on the display 151.

The current display screen and the screen having the same execution depth as the current display screen may have the same relationship as execution screens of the same application, or have the same relationship as execution screens of different applications. Now, concrete examples of the current display screen and the screen having the same execution depth as the current display screen will be described.

For example, the user will not perform any operation on the execution depth of wallpaper where application execution icons are displayed. Therefore, the screen having the same execution depth as the wallpaper may be simply a screen including application execution icons.

In another example, an execution screen of a particular application for performing a particular function and an execution screen of another application for performing the particular function may have the same execution depth. As a more concrete example, the initial execution screen of a first web browsing application and the initial execution screen of a second web browsing application may have the same execution depth. Also, the screen of search results for a particular keyword in the first web browsing application may be the screen of search results for the particular keyword in the second web browsing application.

In still another example, a screen having the same execution depth as a screen for providing particular content may be a screen for providing the same type of content as the particular content. As a more concrete example, an execution screen of a first email application for providing emails addressed to a first account and an execution screen of a second email application for providing emails addressed to a second account.

In yet another example, execution screens of menus of the same level in a particular application may have the same execution depth. More specifically, an execution screen of the menu "view received emails" of an email application and an execution screen of the menu "view sent emails" of the email application may have the same execution depth. Also, an execution screen of the menu "view private emails" of the email application and an execution screen of the menu "view business emails" of the email application may have the same execution depth.

In a further example, an execution screen of a first application for a first user identity module and an execution screen of a second application for a second user identity module and performs the function or role corresponding to the first application may have the same execution depth. More specifically, an email execution screen in the first user identity module and an email execution screen in the second user identity module may have the same execution depth.

Examples of screens having the same execution depth are not limited to the above-described examples.

Figure 4:
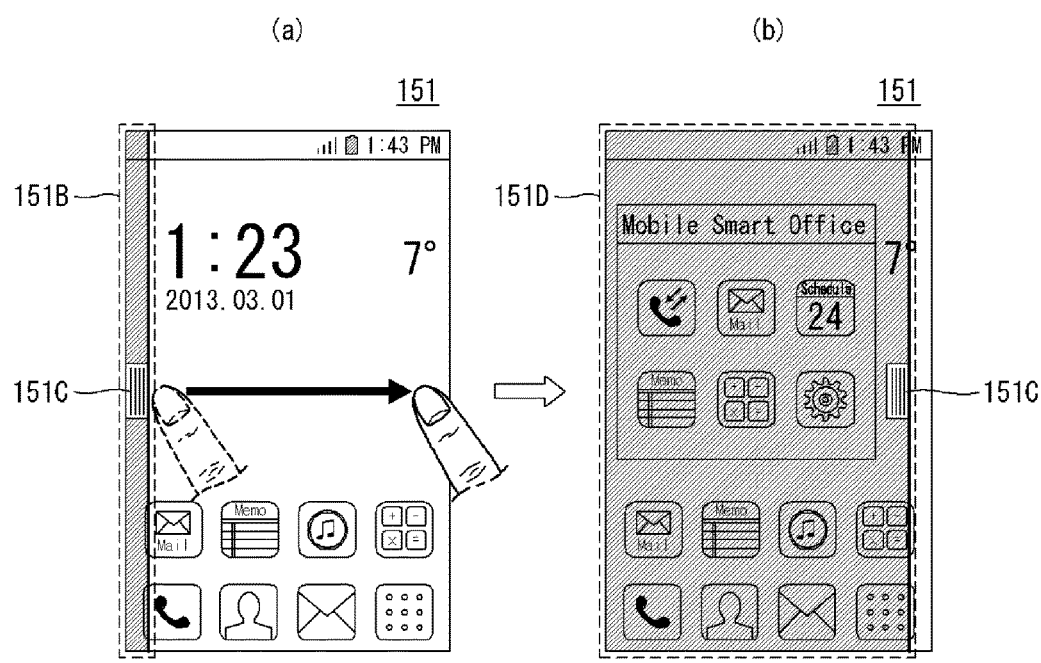
FIG. 4 shows an example where a screen having the same execution depth as the wallpaper is on standby and displayed on the display according to the driving method of the mobile terminal of FIG. 2.

FIG. 4 shows an example where a screen having the same execution depth as the wallpaper is on standby and displayed on the display 151 according to the driving method of the mobile terminal of FIG. 2. It is assumed that a predetermined authentication procedure of FIG. 4 is completed. This also applies to examples to be described later.

Referring to (a) of FIG. 4, when the predetermined authentication procedure is completed, the controller 180 displays on the display 151 a user interface 151B indicating that a predetermined screen corresponding to the wallpaper and having the same execution depth as the wallpaper is on standby. A predetermined trigger operation of FIG. 4 is a touch-and-drag action performed on a predetermined button 151C included in the user interface 151B.

When a touch-and-drag action is performed on the button 151C, the controller 180 may display the predetermined screen 151D to be overlaid on the wallpaper, as shown in (b) of FIG. 4. If the user operates the home or back button (or key) of the mobile terminal 100, with the predetermined screen 151D overlaid on the wallpaper, the controller 180 may get the display 151 to go back to displaying in the way before the predetermined authentication procedure is performed.

The predetermined screen may be a screen including application execution screens like the wallpaper does. The application execution icons included in the predetermined screen may be the execution icons of applications which are designated as private applications by the user.

A user authentication procedure has to be performed so that the execution icons and execution screens of the private applications are displayed on the display 151. Thus, the user's privacy can be protected by using the mobile terminal 100 according to the present invention. As the authentication procedure can be performed, with the current display screen being displayed, the user can easily access the private applications on the wallpaper currently displayed on the display 151.

Figure 5:
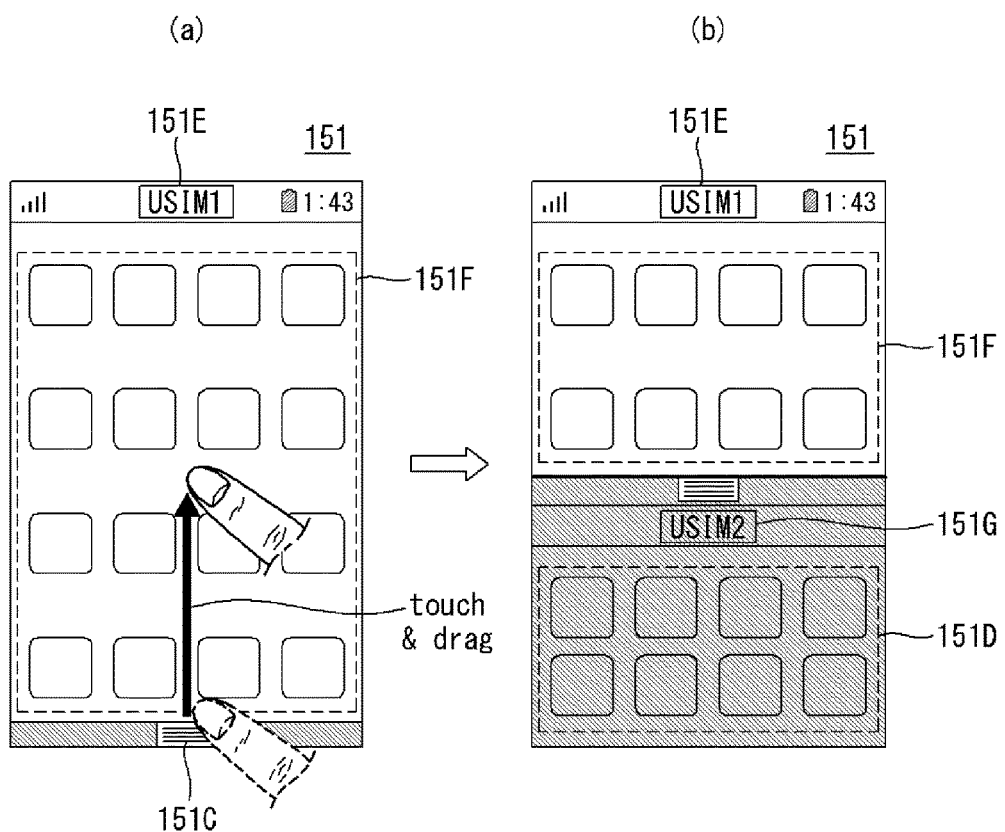
FIG. 5 shows an example where second wallpaper for a second user identity module having the same execution depth as first wallpaper for a first user identity module is on standby and displayed on the display according to the driving method of the mobile terminal of FIG. 2.

FIG. 5 shows an example where second wallpaper for a second user identity module having the same execution depth as first wallpaper for a first user identity module is on standby and displayed on the display 151 according to the driving method of the mobile terminal of FIG. 2.

Referring to (a) of FIG. 5, when a predetermined authentication procedure is completed, the controller 180 displays on the display 151 a button 151C indicating that the second wallpaper having the same execution depth as the first wallpaper 151F is on standby. An icon 151E indicating that the first wallpaper corresponds to the first user identity module USIM1 is displayed in an indicator area in (a) of FIG. 5.

Unlike in FIG. 5, the mobile terminal 100 according to the present invention may not present a separate button indicating that the second wallpaper is on standby. This also applies to other examples. However, it should be noted that the starting portion of a touch-and-drag action for displaying the second wallpaper must be preset. For example, the left portion, right portion, upper portion, or lower portion of the display 151 may be preset as the starting portion of the touch-and-drag action for displaying the second wallpaper, as shown in FIG. 5.

A predetermined trigger operation of FIG. 5 is a touch-and-drag action performed on a predetermined button 151C included in the user interface 151B.

When a touch-and-drag action is performed on the button 151C, the controller 180 may further display a predetermined screen 151D on the wallpaper, as shown in (b) of FIG. 5. An icon 151G displayed in (b) of FIG. 5 indicates that the second wallpaper 151D corresponds to the second user identity module USIM2.

A user authentication procedure has to be performed so that the second wallpaper for the second user identity module is displayed on the display 151. Thus, the user's privacy can be protected by using the mobile terminal 100 according to the present invention. As the authentication procedure can be performed, with the first wallpaper currently being displayed, the user can easily access the second wallpaper on the currently displayed first wallpaper.

Figure 6:
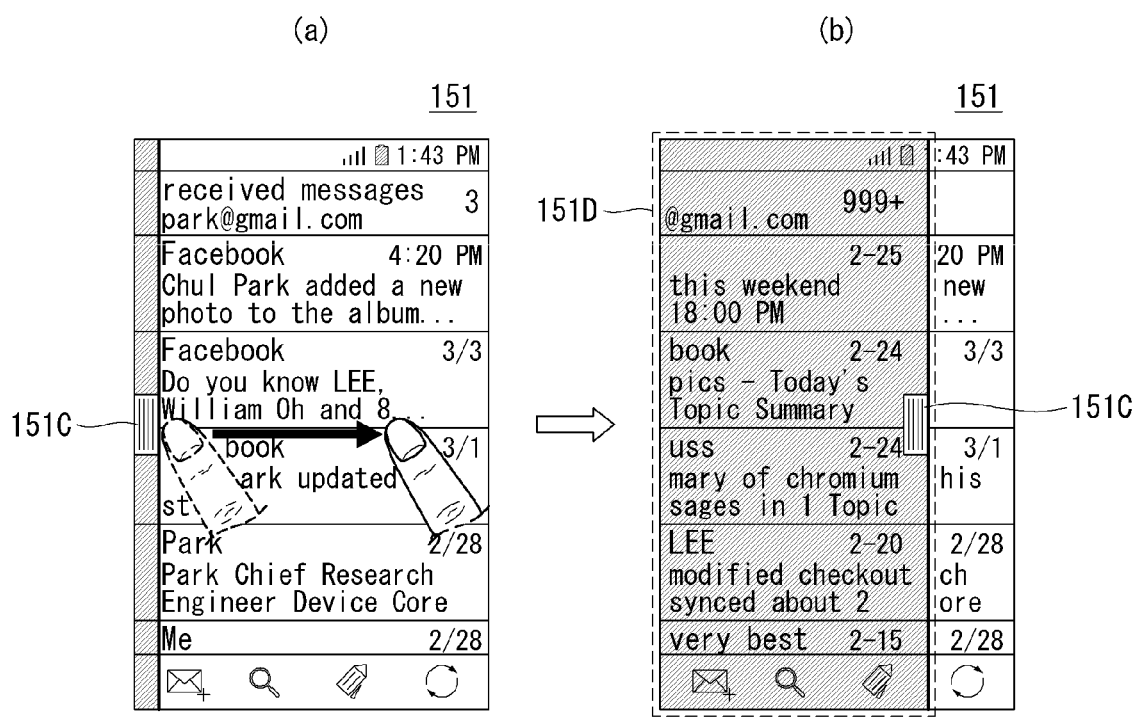
FIG. 6 shows an example where a screen having the same execution depth as an execution screen of an email application displaying the inbox is on standby and displayed on the display according to the driving method of the mobile terminal of FIG. 2.

FIG. 6 shows an example where a screen having the same execution depth as an execution screen of an email application displaying the inbox is on standby and displayed on the display 151 according to the driving method of the mobile terminal of FIG. 2.

Referring to (a) of FIG. 6, when a predetermined authentication procedure is completed, the controller 180 displays on the display 151 a button 151C indicating that a private received email display screen having the same execution depth as the inbox screen of the email application is on standby.

When a trigger operation (touch-and-drag action) is performed on the button 151C, the controller 180 may display the private received email display screen 151D to be overlaid on the inbox screen, as shown in (b) of FIG. 6.

A user authentication procedure has to be performed so that the private received email display screen is displayed on the display 151. Thus, the user's privacy can be protected by using the mobile terminal 100 according to the present invention. As the authentication procedure can be performed, with the inbox screen being displayed, the user can easily access the private received email display screen on the inbox screen.

Figure 7:
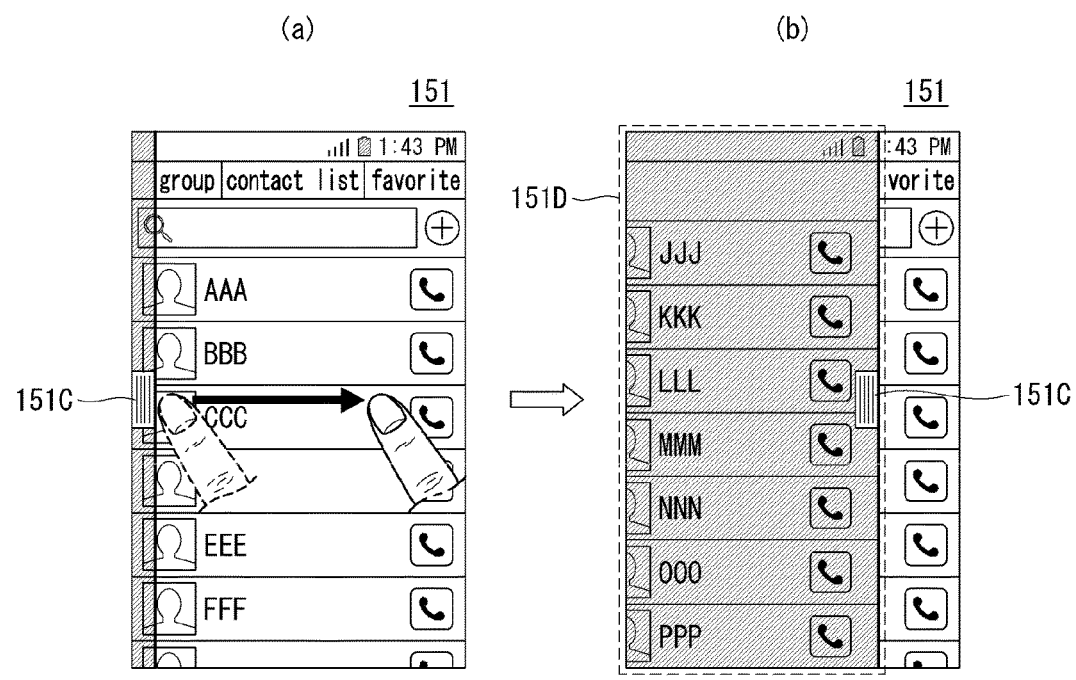
FIG. 7 shows an example where a screen having the same execution depth as an execution screen of a contacts list application is on standby and displayed on the display according to the driving method of the mobile terminal of FIG. 2.

FIG. 7 shows an example where a screen having the same execution depth as an execution screen of a contacts list application is on standby and displayed on the display 151 according to the driving method of the mobile terminal of FIG. 2.

Referring to (a) of FIG. 7, when a predetermined authentication procedure is completed, the controller 180 displays on the display 151 a button 151C indicating that a private contacts list display screen having the same execution depth as the execution screen of the contacts list application is on standby.

When a trigger operation (touch-and-drag action) is performed on the button 151C, the controller 180 may display the private contacts list display screen 151D to be overlaid on the execution screen of the contacts list application, as shown in (b) of FIG. 7.

A user authentication procedure has to be performed so that the private contacts list display screen is displayed on the display 151. Thus, the user's privacy can be protected by using the mobile terminal 100 according to the present invention. As the authentication procedure can be performed, with the execution screen of the contacts list application currently being displayed, the user can easily access the private contacts list display screen.

Figure 8:
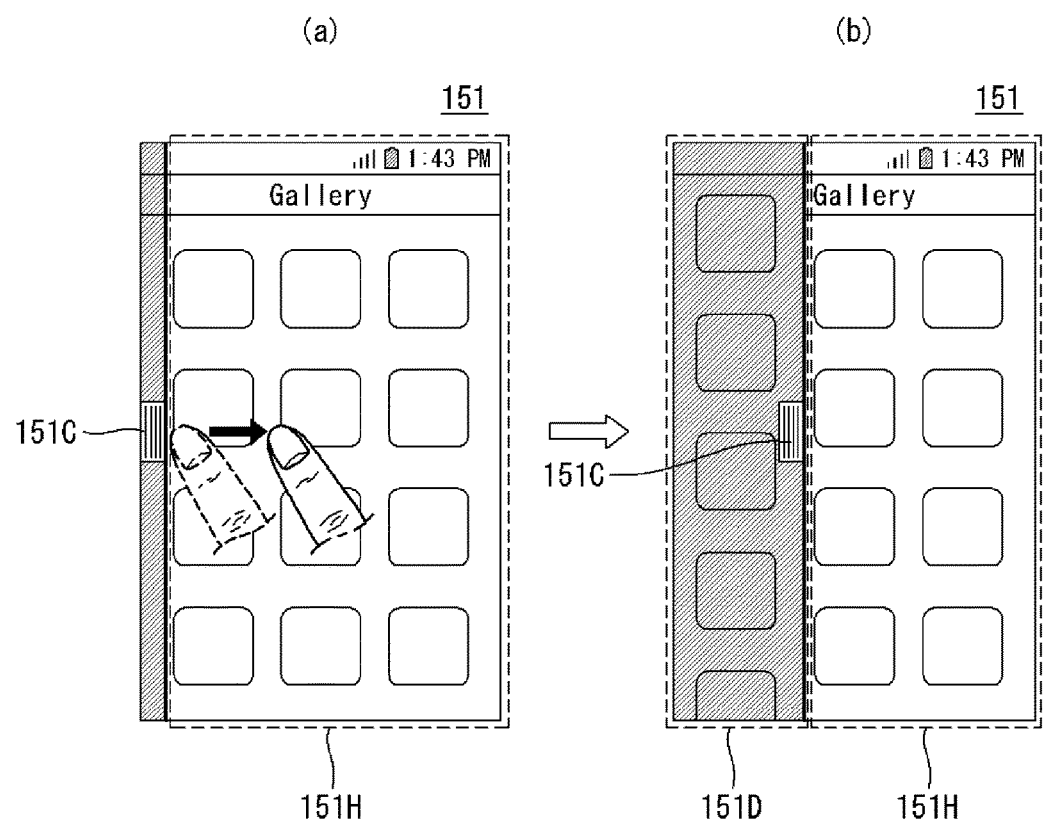
FIG. 8 shows an example where a screen having the same execution depth as an execution screen of a gallery application is on standby and displayed on the display according to the driving method of the mobile terminal of FIG. 2.

FIG. 8 shows an example where a screen having the same execution depth as an execution screen 151H of a gallery application is on standby and displayed on the display 151 according to the driving method of the mobile terminal of FIG. 2.

Referring to (a) of FIG. 8, when a predetermined authentication procedure is completed, the controller 180 displays on the display 151 a button 151C indicating that a private image display screen having the same execution depth as the execution screen 151H of the gallery application is on standby.

When a trigger operation (touch-and-drag action) is performed on the button 151C, the controller 180 may display the private image display screen 151D to be overlaid on the execution screen of the gallery application, as shown in (b) of FIG. 8.

A user authentication procedure has to be performed so that the private image display screen is displayed on the display 151. Thus, the user's privacy can be protected by using the mobile terminal 100 according to the present invention.

As the authentication procedure can be performed, with the execution screen of the gallery application 151H currently being displayed, the user can easily access the private image display screen 151D.

The private received emails, private contacts, and private image illustrated in FIGS. 6 through 8 are examples of private content set by the user. However, the private content available for the driving method of the mobile terminal of FIG. 2 on the mobile terminal 100 according to the present invention is not limited to the above examples.

FIG. 9 shows an example where the initial execution screen of a second web browsing application having the same execution depth as the initial execution screen of a first web browsing application is on standby and displayed on the display 151 according to the driving method of the mobile terminal of FIG. 2.

Referring to (a) of FIG. 9, when a predetermined authentication procedure is completed, the controller 180 displays on the display 151 a button 151C indicating that the initial execution screen of the second web browsing application having the same execution depth as the initial execution screen of the first web browsing application is on standby.

When a trigger operation (touch-and-drag action) is performed on the button 151C, the controller 180 may display the initial execution screen 151D of the second web browsing application to be overlaid on the initial execution screen of the first web browsing application, as shown in (b) of FIG. 9.

FIG. 10 shows an example where a search results screen of the second web browsing application having the same execution depth as a search results screen of the first web browsing application is on standby and displayed on the display 151 according to the driving method of the mobile terminal of FIG. 2.

Referring to (a) of FIG. 10, when a predetermined authentication procedure is completed, the controller 180 displays on the display 151 a button 151C indicating that the screen of search results for the keyword "harry potter" in the second web browsing application having the same execution depth as the screen of search results for the keyword "harry potter" in the first web browsing application is on standby.

When a trigger operation (touch-and-drag action) is performed on the button 151C, the controller 180 may display the search results screen 151D of the second web browsing application to be overlaid on the search results screen of the first web browsing application, as shown in (b) of FIG. 10.

The mobile terminal 100 according to the present invention may be configured in such a way that at least part of information obtained by executing the second web browsing application is not stored or access to at least part of the obtained information is limited.

The obtained information may include the network addresses of accessed sites, cached information of accessed sites, and so on. Access to the obtained information may be limited by using a password, pattern lock, etc set by the user. However, the scope of the present invention is not limited thereto.

As seen above, referring to FIGS. 9 and 10, a user authentication procedure has to be performed so that an execution screen of the second web browsing application is displayed on the display 151, and access to the obtained information may be limited. Thus, the user's privacy can be protected by using the mobile terminal 100 according to the present invention.

As the authentication procedure can be performed, with the execution screen of the first web browsing application being displayed, the user can easily access the execution screen of the second web browsing application simply by a predetermined trigger operation.

The first web browsing application and the second web browsing application are only examples of applications for performing the web browsing function, and the search functions of these applications are only examples of a particular function performed by these applications.

That is, assuming that the execution screen for a particular function of a particular application is currently displayed on the display 151, when a predetermined authentication procedure is performed, the mobile terminal 100 according to the present invention can put the execution screen for the function of another application corresponding to the particular function of the particular application into standby.

Figure 11:
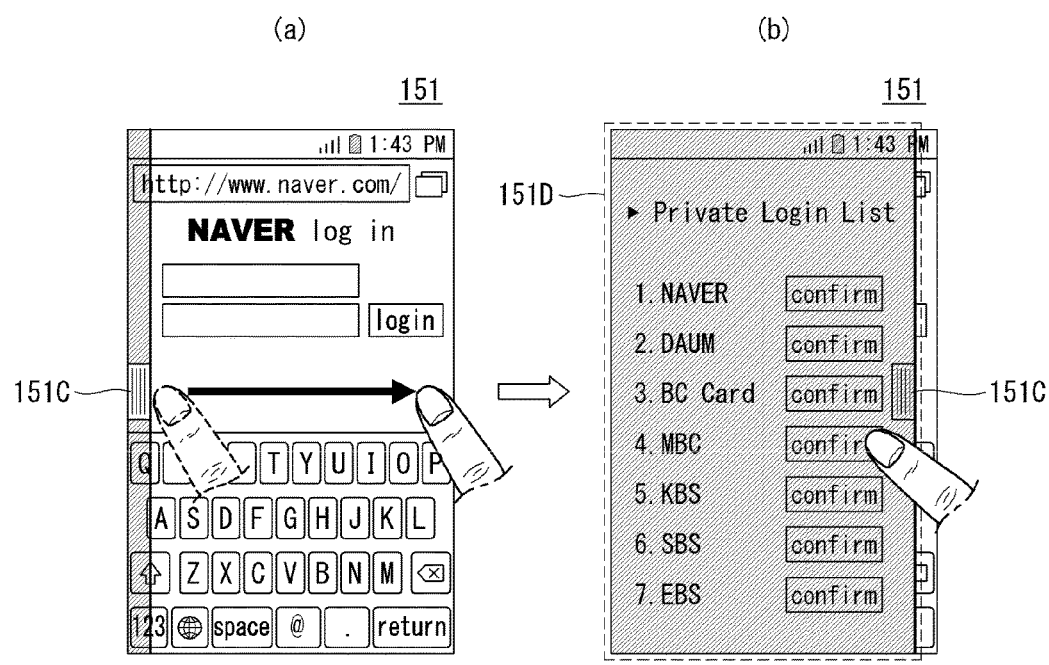
FIG. 11 shows an example where a screen including a user interface for logging in to other sites and having the same execution depth as the log-in screen of a particular site is on standby and displayed on the display 151 according to the driving method of the mobile terminal of FIG. 2.

FIG. 11 shows an example where a screen including a user interface for logging in to other sites and having the same execution depth as the log-in screen of a particular site is on standby and displayed on the display 151 according to the driving method of the mobile terminal of FIG. 2.

Referring to (a) of FIG. 11, when a predetermined authentication procedure is completed, the controller 180 displays on the display 151 a button 151C indicating that a screen including a user interface for logging in to other sites and having the same execution depth as the log-in screen of a particular site is on standby.

When a trigger operation (touch-and-drag action) is performed on the button 151C, the controller 180 may display the screen 151D including the user interface to be overlaid on the log-in screen of the particular site, as shown in (b) of FIG. 11.

When the user chooses a particular button included in the user interface, as shown in (b) of FIG. 11, the controller 180 may perform the function of logging in to the site corresponding to the chosen button by using log-in information entered through the log-in screen for the particular site. Therefore, the user can easily log into other sites simply by performing a predetermined authentication procedure and choosing a button.

The site the user can log in to through the user interface by using the log-in information entered through the log-in screen for the particular site may be a user's private log-in site. Since the private log-in site is displayed on the display 151 after a predetermined authentication procedure is performed, the user's privacy can be protected.

Access to information obtained by accessing a site logged in via the user interface and executing a function on the site may be limited by protective means set by the user. For example, an authentication procedure such as password entry, fingerprint entry, or pattern lock entry may be required in order to access this information.

Figure 12:
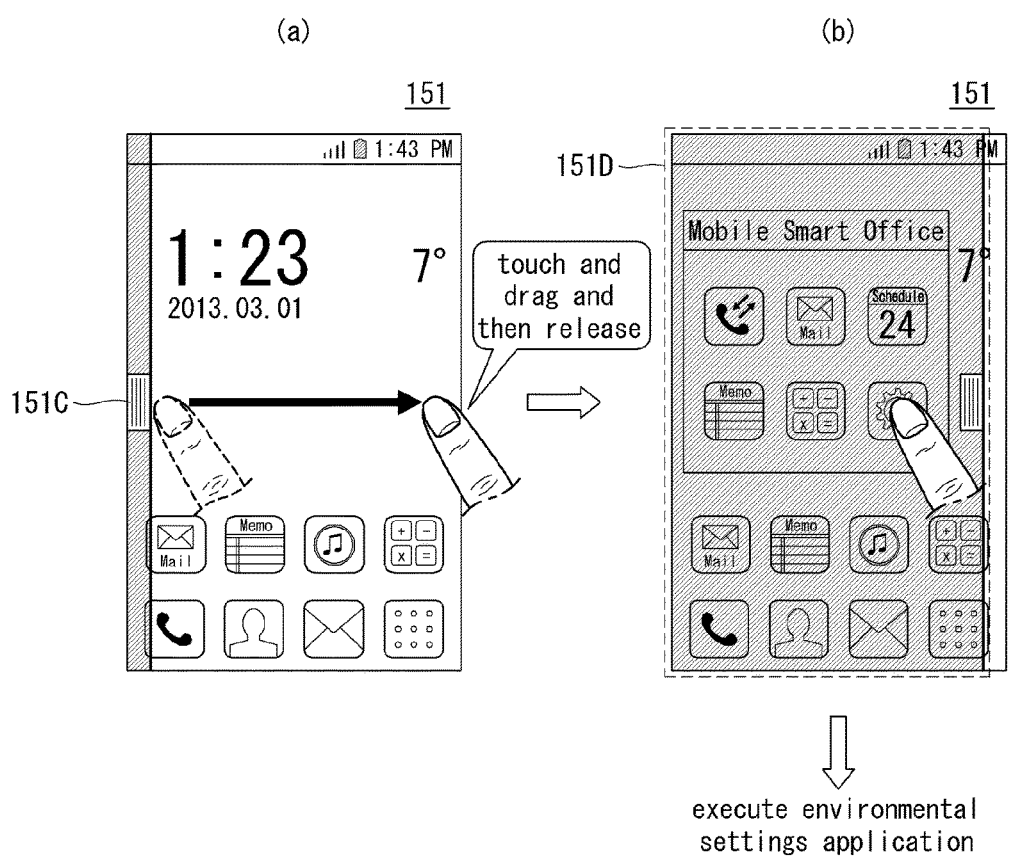
FIGS. 12 to 14 show methods in which a screen having the same execution depth as wallpaper and including a plurality of application execution icons is presented and the user gets a predetermined application executed through the mobile terminal, according to the driving method of the mobile terminal of FIG. 2.
Figure 13:
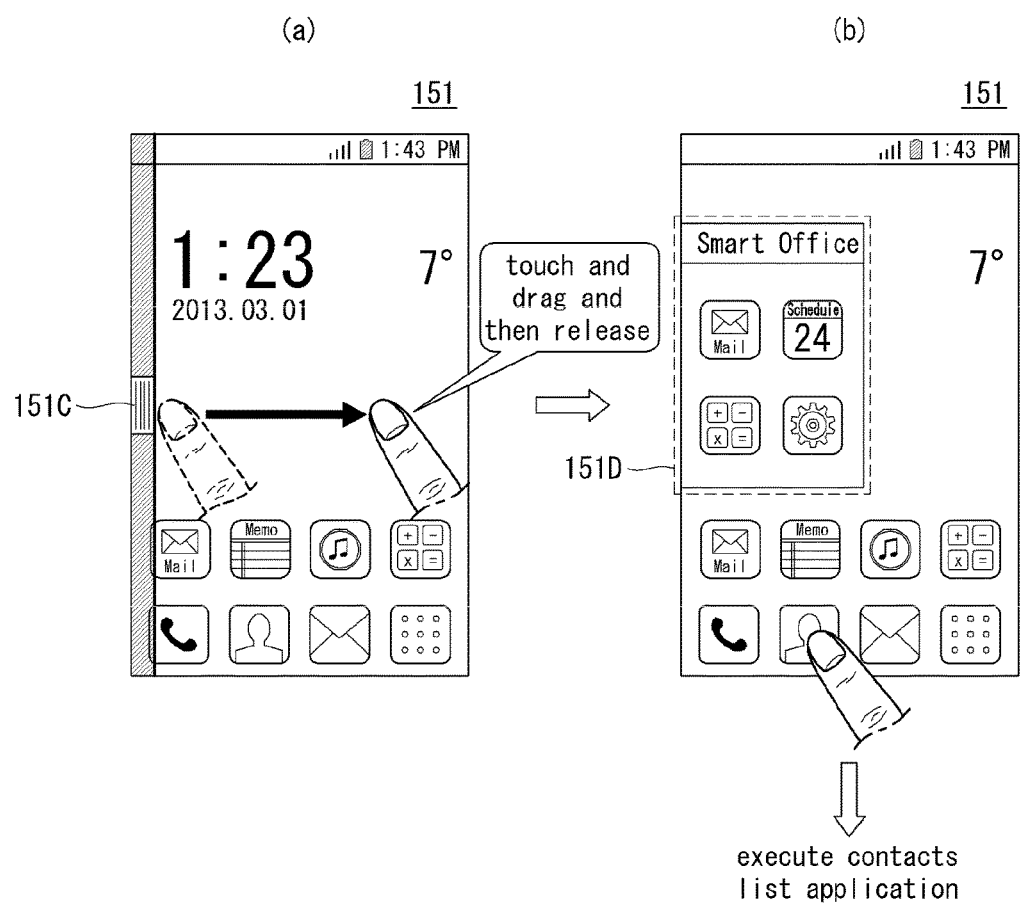
Figure 14:
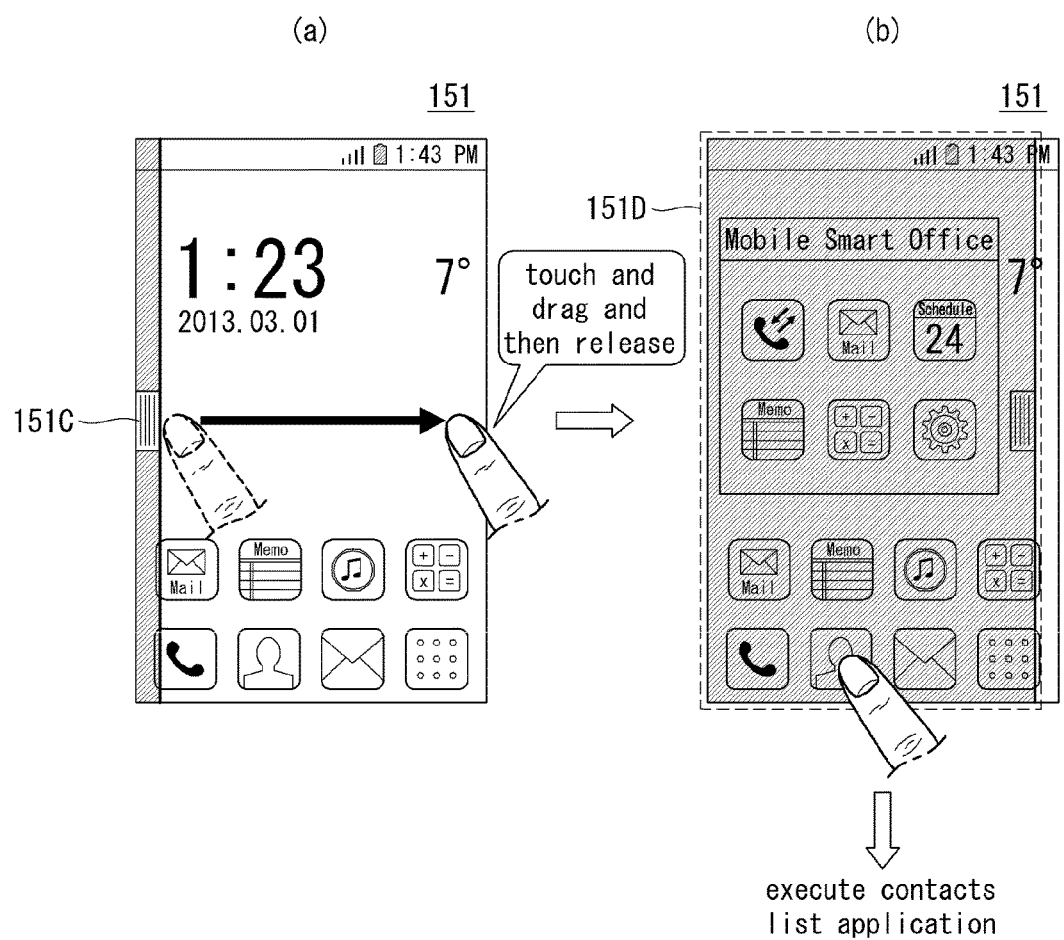

FIGS. 12 to 14 show methods in which a screen 151D having the same execution depth as wallpaper and including a plurality of application execution icons is presented and the user gets a predetermined application executed through the mobile terminal 100, according to the driving method of the mobile terminal of FIG. 2. The icons included in the screen 151D of FIGS. 12 to 14 may be the execution icons of applications corresponding to a user identity module other than the user identity module corresponding to the wallpaper.

Referring to FIG. 12, when the user touches the execution icon of an environmental setting application included in the screen, with the screen 151D being displayed overlaid on the wallpaper, according to the driving method of the mobile terminal of FIG. 2, the controller 180 can execute the environmental setting application.

Referring to FIG. 13, when the user touches the execution icon of a contacts list application displayed in the portion of the wallpaper which is not overlaid with the screen 151D, with the screen 151D being displayed overlaid on part of the wallpaper, according to the driving method of the mobile terminal of FIG. 2, the controller 180 can execute the contacts list application.

For reference, the area of the screen 151D overlaid on the wall paper in FIGS. 12 and 13 may be determined depending on how far the button 151C is touched and dragged.

As discussed in the example illustrated in FIG. 13, if a screen (i.e., a screen including application execution icons) having the same execution depth as the current display screen (i.e., wallpaper) is chosen by a user's trigger operation and displayed overlaid on the current display screen, the mobile terminal 100 according to the present invention is able to keep activating the selectable area in the user interface for the current display screen, which is not overlaid with the chosen screen.

Referring to FIG. 14, when the user touches the contacts list application displayed on the wallpaper overlaid with the semi-transparent portion of the screen 151D, with a part of the screen 151D and the other part being rendered opaque and semi-transparent, respectively, overlaid on the wallpaper, according to the driving method of the mobile terminal 100 of FIG. 2, the controller 180 may execute the contacts list application.

As discussed in the example illustrated in FIG. 14, if a screen (i.e., a screen including application execution icons) having the same execution depth as the current display screen (i.e., wallpaper) is chosen by a user's trigger operation and rendered opaque or semi-transparent, overlaid on the current display screen, the mobile terminal 100 according to the present invention is able to keep activating the selectable area in the user interface for the current display screen, which is not overlaid with the selectable area in the user interface for the chosen screen.

Figure 15:
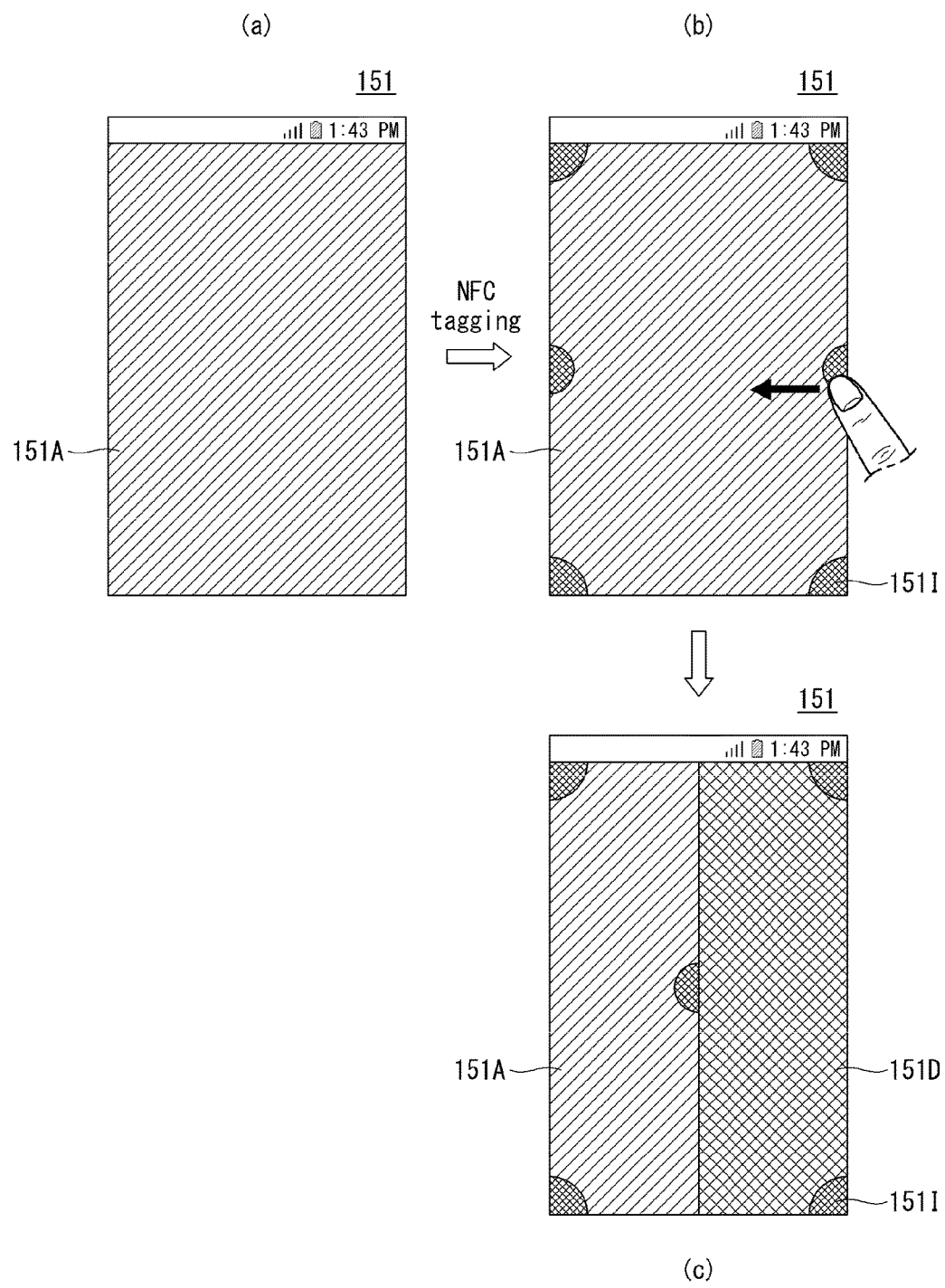
FIG. 15 shows an example where a plurality of screens having the same execution depth as the current display screen is on standby and a screen chosen from these screens is further displayed on the display according to the driving method of the mobile terminal of FIG. 2.

FIG. 15 shows an example where a plurality of screens having the same execution depth as the current display screen 151A is on standby and a screen 151D chosen from these screens is further displayed on the display 151 according to the driving method of the mobile terminal of FIG. 2.

In the situation illustrated in (a) of FIG. 15, an NFC tag is tapped, which is a predetermined authentication procedure. Then, the controller 180 puts a plurality of screens having the same execution depth as the current display screen 151A into standby and displays the icons 1511 corresponding to the respective screens on the display 151.

Next, in the situation illustrated in (b) of FIG. 15, a touch-and-drag action (i.e., trigger operation) is performed on a particular chosen button 151C. Then, the controller 180 displays the screen corresponding to the chosen icon to be overlaid on the current display screen, as shown in (c) of FIG. 11. The area of the screen corresponding to the chosen icon overlaid on the current display screen may be determined depending on how far the chosen icon is touched and dragged.

Unlike in FIG. 15, the mobile terminal 100 according to the present invention may not display on the display 151 the icons indicating that a plurality of screens are on standby. Nevertheless, the starting point in time of a touch-and-drag action corresponding to each of the plurality of screens may be preset.

Figure 16:
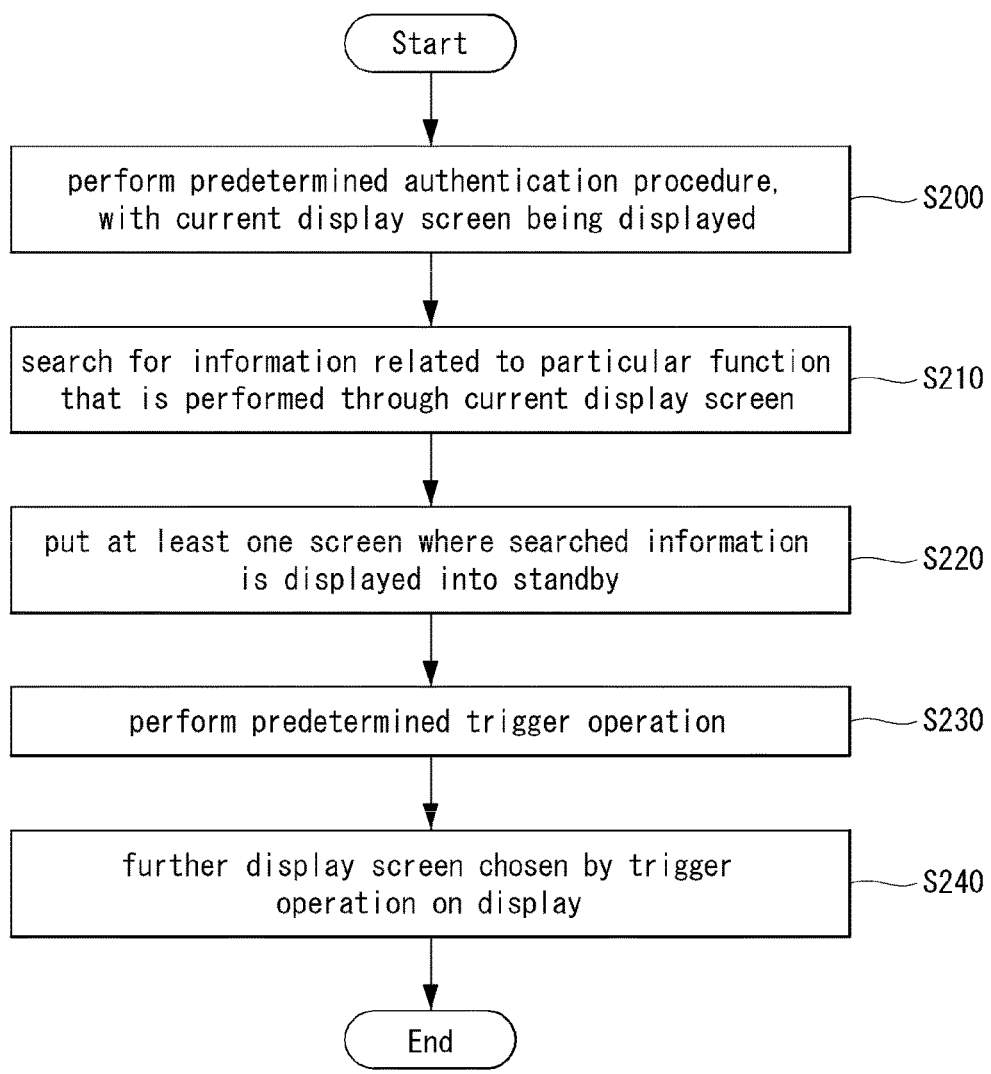
FIG. 16 is a flowchart showing another example of a driving method of a mobile terminal according to the present invention.

FIG. 16 is a flowchart showing another example of a driving method of a mobile terminal according to the present invention. The driving method will be described below with reference to the drawings as necessary.

With the current display screen being displayed on the display 151, a predetermined authentication procedure is performed (S200). Then, the controller 180 searches for information related to a particular function that is performed through the current display screen (S210), and puts at least one screen where the searched information is displayed into standby (S220).

The information related to the particular function may be searched for in the memory 160 included in the mobile terminal 100, an external device connected to the mobile terminal 100, and a wired/wireless network to which the mobile terminal 100 is connected.

A predetermined trigger operation is performed by the user, with the at least one screen being on standby (S230). Then, the controller 180 chooses one of the at least one screen that corresponds to the predetermined trigger operation, and further displays the chosen screen on the display 151 (S240).

Figure 17:
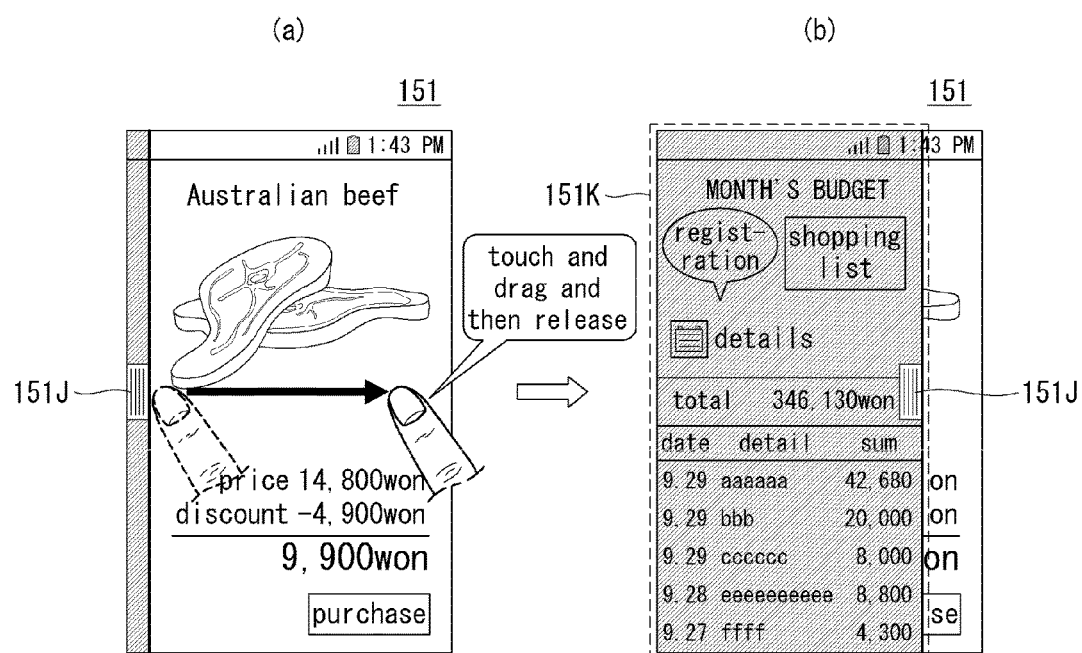
FIG. 17 shows an example where information related to a payment function that is performed through the current screen, according to the driving method of the mobile terminal of FIG. 16.

FIG. 17 shows an example where information related to a payment function that is performed through the current screen, according to the driving method of the mobile terminal of FIG. 16. It is assumed that a predetermined authentication procedure of FIG. 17 is completed. This also applies to examples to be described later.

Referring to (a) of FIG. 17, when the predetermined authentication procedure is completed, the controller 180 searches for information related to the payment being made on the current display screen, and displays on the display 151 a button 151J indicating that a screen containing this information is on standby. A predetermined trigger operation of FIG. 17 is a touch-and-drag action performed on the button 151J.

When a touch-and-drag action is performed on the button 151J, the controller 180 may display a screen 151K containing the searched information related to the payment to be overlaid on the current display screen, as shown in (b) of FIG. 17. If the user operates the home or back button (or key) of the mobile terminal 100, in the situation illustrated in (b) of FIG. 17, the controller 180 may get the display 151 to go back to displaying the payment screen of (a) of FIG. 17.

The information related to the payment may include, but is not limited to, a list of payments made on the site where the payment is being made, a list of payments made by the same means of payment as used on this site, and so on.

A user authentication procedure has to be performed so that the searched information related to the payment is displayed on the display 151. Thus, the user's privacy can be protected by using the mobile terminal 100 according to the present invention. As the authentication procedure can be performed immediately on the payment screen currently displayed on the display 151, the user can easily access the information related to the payment. Such benefits as privacy protection and easy access to information can be achieved in the embodiments to be described below as well.

Figure 18:
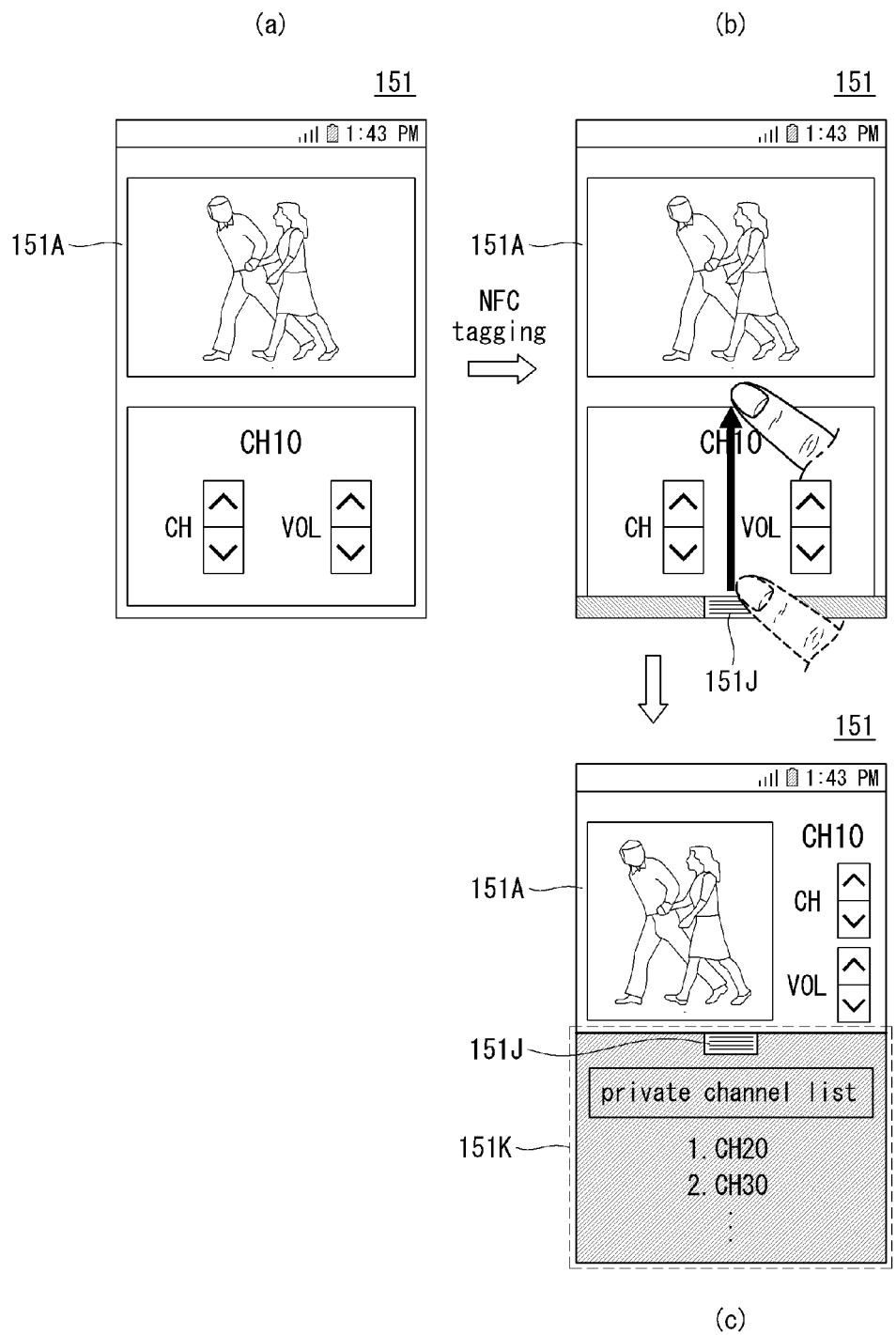
FIG. 18 shows an example where information related to a TV viewing function performed through the current screen is searched for and displayed, according to the driving method of the mobile terminal of FIG. 16.

FIG. 18 shows an example where information related to a TV viewing function performed through the current screen is searched for and displayed, according to the driving method of the mobile terminal of FIG. 16.

In the situation illustrated in (a) of FIG. 18, when a predetermined authentication procedure is completed, the controller 180 searches for information related to the TV viewing function being performed on the current display screen, as shown in (b) of FIG. 18, and displays on the display 151 a button 151J indicating that a screen containing this information is on standby. The information related to the TV viewing function may be information related to channels designated as private channels by the user. The information related to private channels may be stored in the memory 160 or a server that provides the TV viewing function.

When a touch-and-drag action is performed on the button 151J, the controller 180 may display on the display 151 a screen 151K showing the searched information related to the TV viewing function, i.e., a user's private channel list, as shown in (c) of FIG. 18.

Figure 19:
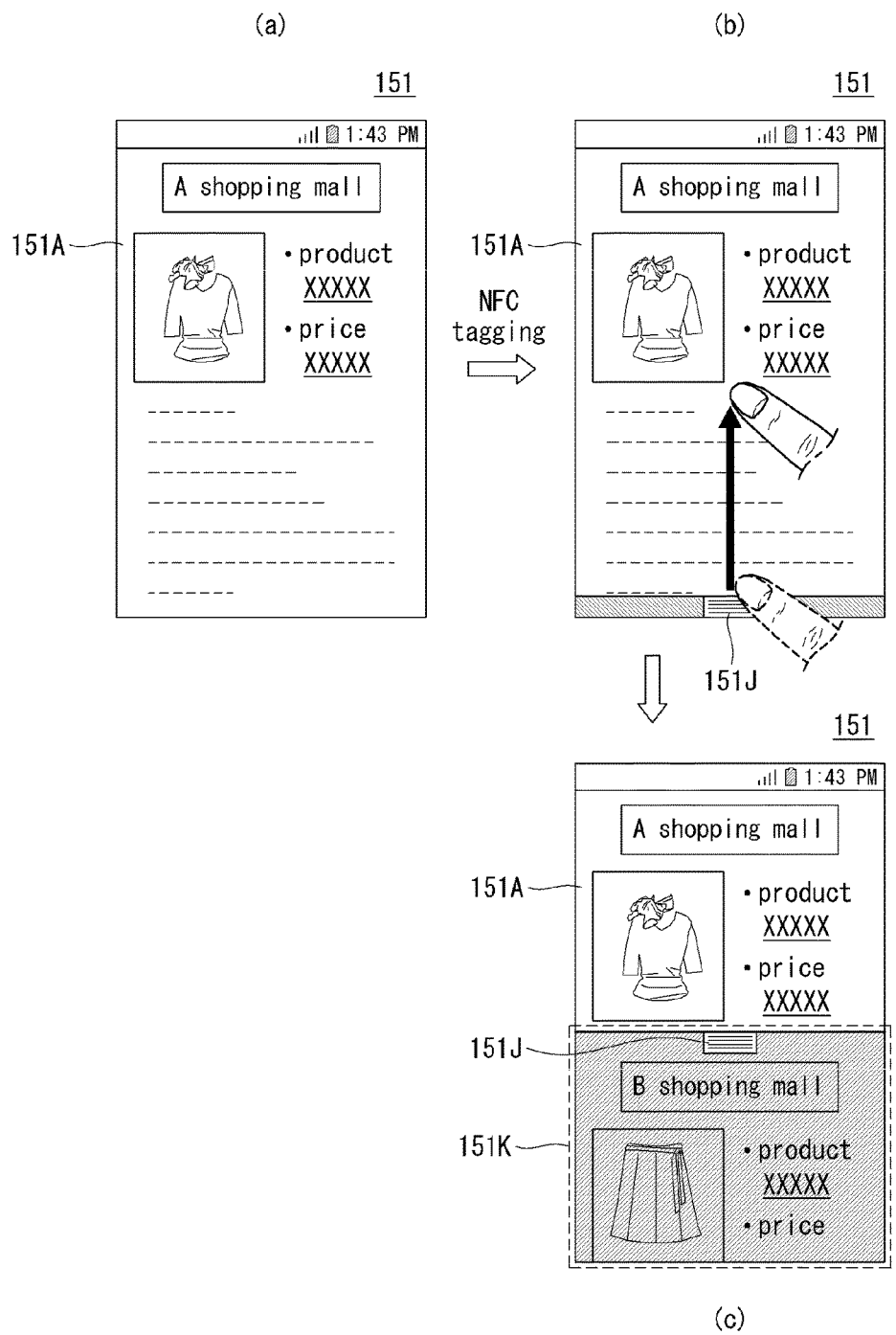
FIG. 19 shows an example where information related to an online shopping function performed through the current screen is searched for and displayed, according to the driving method of the mobile terminal of FIG. 16.

FIG. 19 shows an example where information related to an online shopping function performed through the current screen is searched for and displayed, according to the driving method of the mobile terminal of FIG. 16.

In the situation illustrated in (a) of FIG. 19, when a predetermined authentication procedure is completed, the controller 180 searches for information related to the online shopping being done on the current display screen, as shown in (b) of FIG. 19, and displays on the display 151 a button 151J indicating that a screen containing this information is on standby.

When a touch-and-drag action is performed on the button 151J, the controller 180 may display on the display 151 a screen 151K containing the searched information related to the online shopping, as shown in (c) of FIG. 19.

The searched information related to the online shopping as illustrated in FIG. 19 involves, but is not limited to, other online shopping sites. For example, the information related to the online shopping may include information related to the item the user has selected, information about items similar to the item the user has selected, information related to the seller of the item the user has selected, and so on.

Although not shown, if the current display screen is a log-in screen, and information about another site the user wants to log in to by using the log-in information entered through the log-in screen is stored in advance in the memory 160, the mobile terminal 100 according to the present invention may search for the information about another site in the memory 160 and presents a screen containing this information, according to the driving method of the mobile terminal of FIG. 16. For example, the presented screen may be, but is not limited to, a user interface via which the user can log in to a selected site by using the log-in information entered through the log-in screen, as illustrated in (b) of FIG. 11.

The above-described driving methods of a mobile terminal according to the present invention may be implemented in the form of program instructions that can be executed through a variety of computer means, and recorded in a computer-readable medium. The computer-readable medium may include program instructions, data files, a data structure or the like singly or in combination. The program instructions recorded in the medium may be specially designed and constructed for the present invention or be well known to and available by those skilled in the field of computer software.

Examples of the computer-readable recording medium include magnetic media such as a hard disk, a floppy disk and a magnetic tape, optical media such as Compact Disk (CD)-ROM and a Digital Versatile Disk (DVD), magneto-optical media such as a floptical disk, and hardware devices such as ROM, RAM and flash memory, that are specially designed to store and execute program instructions. Examples of the program instructions include not only machine language code constructed by a compiler but also high level language code executable by a computer via an interpreter. The hardware devices may be constructed to act as one or more software modules for performing the operation of the present invention, and vice versa.

While the present invention has been described with respect to specific embodiments and drawings, the present invention is not limited to these embodiments, and those skilled in the art may make various modifications and alterations to the disclosure.

Accordingly, the scope of the invention should be determined not by the embodiments illustrated, but by the claims below and their equivalents.

What is claimed is:

1. A mobile terminal comprising:
a display configured to display a current display screen, wherein the current display screen is an execution screen of a first application; and
a controller configured to:
cause the display to display a result of performing a function of the first application on the current display screen;
perform an authentication procedure while the current display screen is displayed;
place a plurality of screens on standby when authentication is successful according to the authentication procedure, wherein the plurality of screens are execution screens of a plurality of applications other than the first application, each of the execution screens containing a result of performing a function of a respectively corresponding one of the plurality of applications, the function of the respectively corresponding one of the plurality of applications corresponding to the function of the first application;
cause the display to display a plurality of indicators when the authentication is successful, each of the plurality of indicators associated with a corresponding one of the plurality of screens and displayed on a corresponding edge portion of the current display screen, wherein the plurality of indicators indicate that the plurality of screens are on standby;
select a screen from among the plurality of screens on standby in response to a preset trigger operation received via one of the plurality of indicators while the current display screen is displayed; and
cause the display to display the selected screen such that the displayed selected screen is overlaid on a first portion of the current display screen, wherein the first portion is a partial portion of the current display screen, and wherein a size of the selected screen increases progressively while a size of the first portion decreases according to progress of the preset trigger operation.

2. The mobile terminal of claim 1, wherein the plurality of indicators are not displayed when authentication is not successful according to the authentication procedure.

3. The mobile terminal of claim 1, wherein the controller is further configured to:
not store at least part of information obtained by executing on the selected screen; or
limit access to at least part of the obtained information.

4. The mobile terminal of claim 1, wherein the plurality of screens comprise a screen including icons for executing applications designated as private applications when the current display screen is a wallpaper.

5. The mobile terminal of claim 1, wherein the plurality of screens comprise a wallpaper assigned to a second user identity module of the mobile terminal when the current display screen is a wallpaper assigned to a first user identity module and the mobile terminal is operated according to the first user identity module.

6. The mobile terminal claim 1, wherein:
the plurality of screens comprise an execution screen of a second application that performs a function corresponding to a function of a first application when the current display screen is an execution screen of the first application that is operated based on a first user identity module of the mobile terminal; and
the second application is executed based on a second user identity module of the mobile terminal.

7. The mobile terminal of claim 1, wherein:
the current display screen includes a user interface for logging in to a first website; and
the plurality of screens comprise a screen including a user interface for logging in to a second website by using same log-in information that is used for the first website.

8. The mobile terminal of claim 1, wherein:
a second portion of the current display screen that is not overlaid by the displayed selected screen comprises a user interface; and
a user input is receivable via the user interface while both the selected screen and the first user interface of the current display screen are displayed.

9. The mobile terminal of claim 8, wherein an area of the displayed selected screen is determined according to a degree of the preset trigger operation performed.

10. The mobile terminal of claim 9, wherein:
the preset trigger operation comprises touching a designated area of the one of the plurality of indicators while the current display screen is displayed and dragging from the touched area; and
the area of the displayed selected screen is determined based on a distance of the dragging.

11. The mobile terminal of claim 1, wherein the controller is further configured to cause the display to display the selected screen semi-transparently such that the current display screen is at least partially overlaid by the semi-transparent selected screen, and both a user interface on the selected screen and the plurality of indicators on the current display screen are ready for receiving a user input.

12. The mobile terminal of claim 1, wherein each of the plurality of screens that is on standby is not displayed until a corresponding one of the plurality of indicators is manipulated.

13. The mobile terminal of claim 1, wherein the authentication procedure comprises a near field communication (NFC) tagging.

14. The mobile terminal of claim 1, wherein the first application and the plurality of applications perform a same function.

15. The mobile terminal of claim 1, wherein the execution screen of the first application and the execution screens of the plurality of applications are search results screens.

16. The mobile terminal of claim 15, wherein the first application and the plurality of applications are web browsing applications.

17. The mobile terminal of claim 16, wherein the function of the first application and the function of the respectively corresponding one of the plurality of applications are performing a search for a same keyword.

18. The mobile terminal of claim 17, wherein the same keyword is received via the execution screen of the first application such that the same keyword is also entered to the execution screens of the plurality of applications in response to the same keyword received via the execution screen of the first application.

19. The mobile terminal of claim 1, wherein the preset trigger operation comprises dragging the one of the plurality of indicators toward the execution screen of the first application.

20. The mobile terminal of claim 1, wherein the function of the respectively corresponding one of the plurality of applications and the function of the first application are same or similar.

* * * * *